United States Patent [19]

Santos

[11] Patent Number: 5,550,989
[45] Date of Patent: Aug. 27, 1996

[54] BRIDGE CIRCUIT THAT CAN ELIMINATE INVALID DATA DURING INFORMATION TRANSFER BETWEEN BUSES OF DIFFERENT BITWIDTHS

[75] Inventor: Gregory N. Santos, Boca Raton, Fla.

[73] Assignee: International Business Machines Corporation, Armonk, N.Y.

[21] Appl. No.: 69,234

[22] Filed: May 28, 1993

[51] Int. Cl.$^6$ .............................. G06F 13/00; G06F 13/36
[52] U.S. Cl. ........................... 395/306; 395/307; 395/308; 370/85.13
[58] Field of Search ..................................... 395/325, 308, 395/306, 307, 309; 370/85.13

[56]  References Cited

U.S. PATENT DOCUMENTS

| | | | |
|---|---|---|---|
| 4,547,849 | 10/1985 | Louie et al. | 395/823 |
| 4,878,166 | 10/1989 | Johnson et al. | 395/425 |
| 5,003,463 | 3/1991 | Coyle et al. | 395/275 |
| 5,025,412 | 6/1991 | Dalrymple et al. | 395/275 |
| 5,101,478 | 3/1992 | Fu et al. | 395/275 |
| 5,142,672 | 8/1992 | Johnson et al. | 395/500 |
| 5,255,374 | 10/1993 | Aldereguia et al. | 395/325 |
| 5,317,715 | 5/1994 | Johnson et al. | 395/425 |

FOREIGN PATENT DOCUMENTS

0531559A1  9/1991  European Pat. Off. .

OTHER PUBLICATIONS

IBM Technical Disclosure Bulletin vol. 31, No. 1, Jun. 1988 pp. 36–38.
IBM Technical Disclosure Bulletin vol. 33, No. 12, May 1991, p. 409.
"PCI promises solution to local–bus bottleneck", Computer Design, Aug. 1992, pp. 36–40.

*Primary Examiner*—Jack B. Harvey
*Assistant Examiner*—Jeffrey K. Seto
*Attorney, Agent, or Firm*—John A. Kastelic; Calfee, Halter & Griswold

[57]  ABSTRACT

Hardware logic within a host bridge that connects a CPU local bus to a peripheral bus that determines if data to be transmitted on the CPU local bus is non-contiguous and, if so, substitutes contiguous data for the non-contiguous data to ensure that the CPU local bus does not malfunction. Simultaneously, the hardware translates data transfers between a peripheral bus that is limited by its architecture to data strings of a standard length and a CPU local bus that permits dynamic bus sizing.

30 Claims, 7 Drawing Sheets

BRIDGE CIRCUIT THAT CAN ELIMINATE INVALID DATA DURING INFORMATION TRANSFER BETWEEN BUSES OF DIFFERENT BITWIDTHS

RELATED APPLICATIONS

The following United States patent applications are incorporated herein by reference as if they had been fully set out: application Ser. No. 08/068,477 filed May 28, 1993 Entitled "DIRECT MEMORY ACCESS (DMA) CYCLE LOGIC FOR MULTIPLE BUS COMPUTER SYSTEM" (Further identified as Attorney Docket BC9-93-010); application Ser. No. 08/069,253 filed May 28, 1993 Entitled "ARBITRATION LOGIC FOR MULTIPLE BUS COMPUTER SYSTEM RELATED APPLICATIONS" (Further identified as Attorney Docket BC9-93-011); application Ser. No. 08/070,134 filed May 28, 1993 Entitled "METHOD AND APPARATUS FOR INITIALIZING MULTIPLE BUS NETWORKS IN AN INFORMATION HANDLING SYSTEM" (Further identified as Attorney Docket BC9-93-012); application Ser. No. 08/069,230 filed May 28, 1993 Entitled "ERROR CAPTURE LOGIC FOR PERIPHERAL BUS IN MULTIPLE BUS COMPUTER SYSTEM" (Further identified as Attorney Docket BC9-93-025); application Ser. No. 08/068,882 filed May 28, 1993 Entitled "METHOD AND APPARATUS FOR PROVIDING BACK-TO-BACK DATA TRANSFERS IN AN INFORMATION HANDLING SYSTEM HAVING A MULTIPLEXED BUS" (Further identified as Attorney Docket BC9-93-026); and application Ser. No. 08/068,877 filed May 28, 1993 Entitled "BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS" (Further identified as Attorney Docket BC9-93-031).

FIELD OF THE INVENTION

The present invention relates generally to information handling systems and more specifically to a method and apparatus for ensuring that data communications between components and peripheral devices connected to two different bus architectures in an information handling system are complete and accurate when the communications are from a device or component adapted to one bus architecture to a device or component adapted to a different bus architecture.

BACKGROUND OF THE INVENTION

Referring generally to information handling systems, they normally have as their main component a central processing unit (CPU), which directs all communications in the system and orchestrates all commands to be executed by the information handling system. Information handling systems also usually have a network, or networks, of physical connection devices called buses. These networks connect the CPU to any number of peripheral devices and components so that the CPU can communicate with the peripheral devices and components.

One type of bus that is used in information handling systems is a CPU local bus. Also referred to as a system bus, the CPU local bus is specially designed for connecting the CPU directly to key components of the information handling system, such as the system memory and memory controller. A CPU local bus is a high performance bus, meaning that it executes data transfers between the CPU and the other components connected to the bus at a high rate of speed and can handle a multitude of data transfers simultaneously. Another type of bus found in an information handling system is a peripheral bus. Peripheral buses are designed to connect peripheral devices, such as input/output devices (I/O) and graphics packages, to the information handling system. Peripheral buses are normally connected to the CPU and the rest of the central components of the information handling system through a host bridge that connects the peripheral bus to a CPU local bus.

Each type of bus has a different set of standard protocols or rules that it uses to conduct the data transfers between the different devices and components connected to it. These protocols are designed into the bus and are called the "architecture" of the bus. Various protocols that may comprise a type of bus architecture are the bit-length of the data strings recognized by the bus, whether different signals are enabled when they are either low or high, whether data on the bus is multiplexed on one line or transmitted in parallel on several lines, or whether certain types of data are unacceptable and cause the information handling system to malfunction or "crash".

The bus architectures of CPU local buses and peripheral buses are normally different. The different architectures create communication problems when data must be transferred between a peripheral device connected to a peripheral bus, and the CPU or another component of the system connected to the CPU local bus. Since different bus architectures are involved in such a data transfer, data being transferred from the first bus architecture may not be in a form which is useable or intelligible by the second bus architecture.

Thus, an apparatus and method is needed to "translate" data that is transferred from one bus architecture to another. The hardware and logic used to translate data transferred between two different bus architectures is normally contained in the bridge through which the two different buses are connected. Accordingly, the host bridge connecting a CPU local bus and a peripheral bus must contain the logic and hardware that translates communications between the two buses and ensures that data is transferred between the two buses intelligibly.

One difference between the bus architectures of a CPU local bus and a peripheral bus is the reaction of the respective buses to the presence of non-contiguous data being transmitted on them. Non-contiguous data consists of bytes of enabled data separated by a byte, or bytes, of data that is not enabled. Not enabled, or disabled, data is data that is unintelligible and should be ignored and not transferred during the particular data transfer. Some types of peripheral buses and devices connected to these peripheral buses can transmit non-contiguous data without experiencing a malfunction. In contrast, transmission of non-contiguous data on a CPU local bus can cause the information handling system to crash or seriously malfunction.

Another difference between peripheral bus architecture and the architecture of the CPU local bus is that the CPU local bus can intelligibly transmit data in different bit lengths while peripheral buses may be limited to one standard bit length for data transmissions. Thus, the CPU local bus is compatible with components that are designed to transmit and receive data in various bit lengths. For example, a component that only transmits and receives data strings that are eight bits long can transmit or receive data when connected to a CPU local bus. Similarly, a 16-bit or 32-bit component can also use the CPU local bus for data transfers.

The ability of the CPU local bus to accommodate data transfers in various bit lengths is called dynamic bus sizing.

In contrast, a peripheral bus may be limited to transmitting data strings of a standard bit length, such as 32 bits. Thus, a component connected to the CPU local bus that only transfers and accepts data in a bit length different from the standard bit length for data transmitted on a particular peripheral bus cannot communicate with peripheral devices connected to the peripheral bus without some type of intervening data translation.

Thus, it is an object of this invention to provide a method and apparatus that determines if data to be transmitted on a CPU local bus is non-contiguous and, if so, substitutes contiguous data for said non-contiguous data to ensure that the CPU local bus does not malfunction.

It is a further object of this invention to provide a method and apparatus that translates data transfers between a device connected to a peripheral bus and a component connected to the CPU local bus that is designed for a bit length of data different from the standard bit length of data in the architecture of the peripheral bus.

It is yet a further object of this invention to provide these methods and apparatus in the hardware that comprises a host bridge that connects the CPU local bus to the peripheral bus.

SUMMARY OF THE INVENTION

According to the present invention, hardware logic within a host bridge that connects a CPU local bus to a peripheral bus is provided that determines if data to be transmitted on a CPU local bus is non-contiguous and, if so, substitutes contiguous data for said non-contiguous data to ensure that the CPU local bus does not malfunction. The inventive hardware also translates data transfers between a peripheral bus that is limited by its architecture to data strings of a standard length and a CPU local bus that permits dynamic bus sizing.

DETAILED DESCRIPTION OF THE PREFERRED EMBODIMENT

Figure 1A:
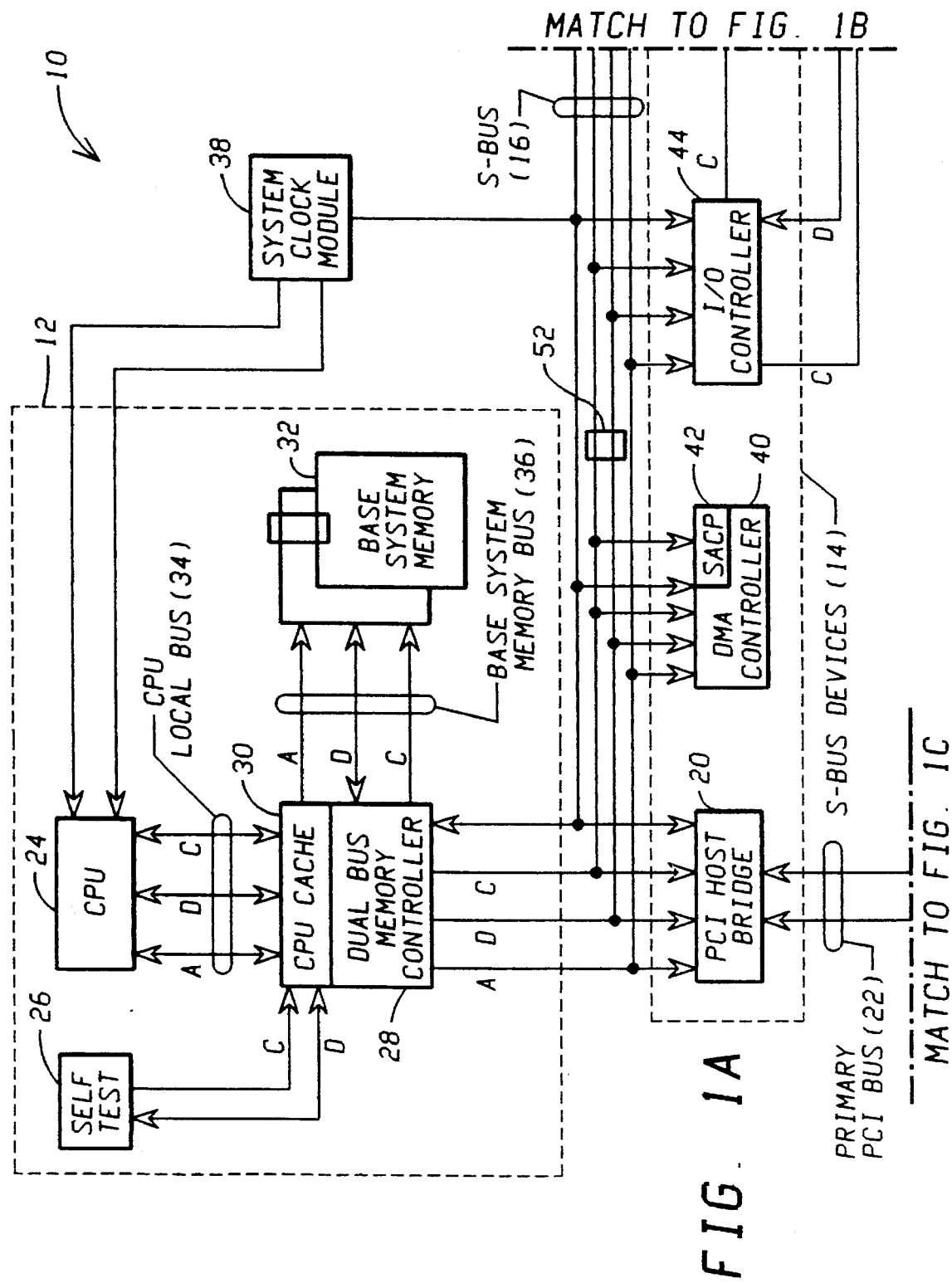
FIGS. 1A through 1C, taken together, is a schematic drawing of an information handling system with multiple buses.
Figure 1B:
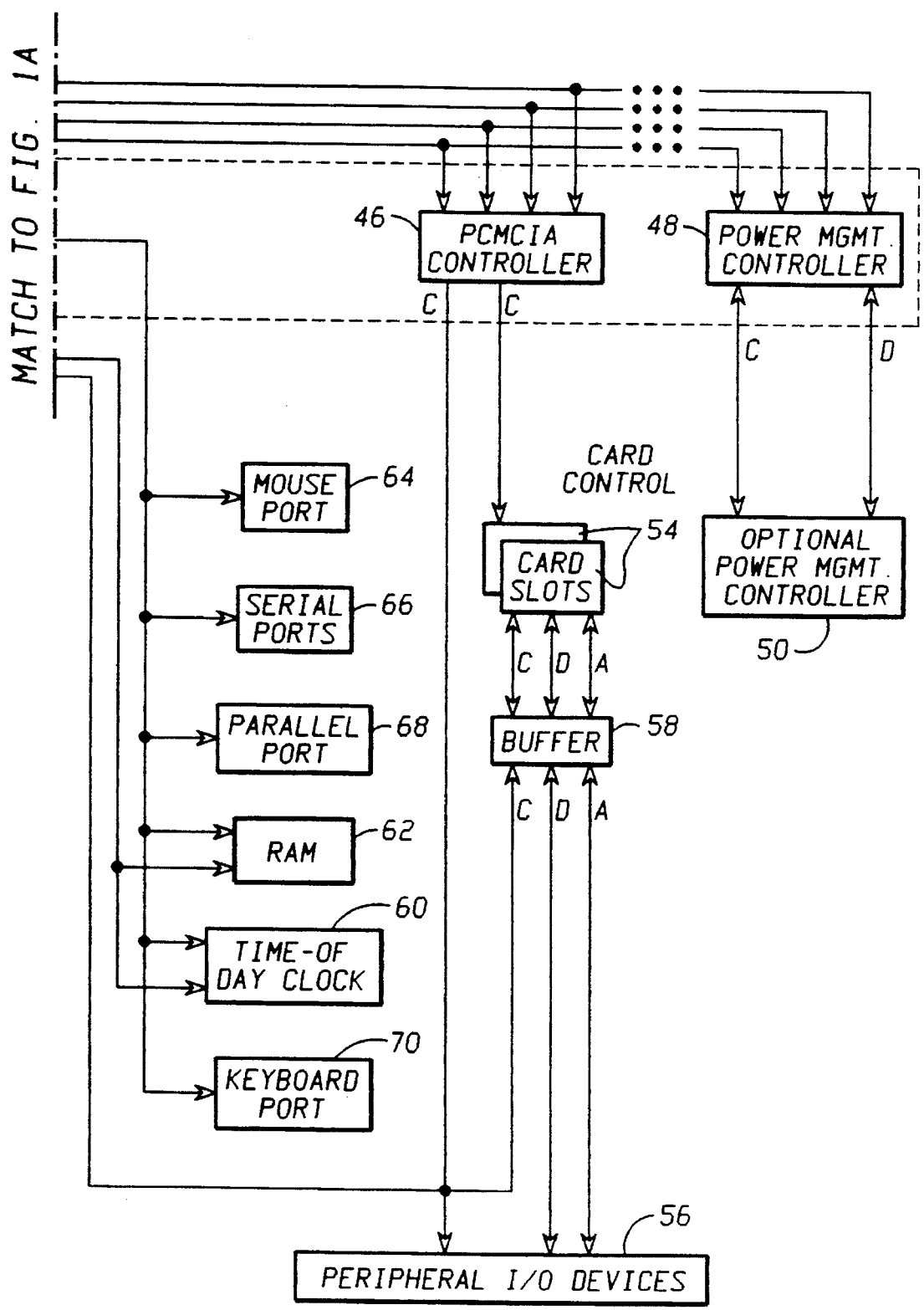
Figure 1C:
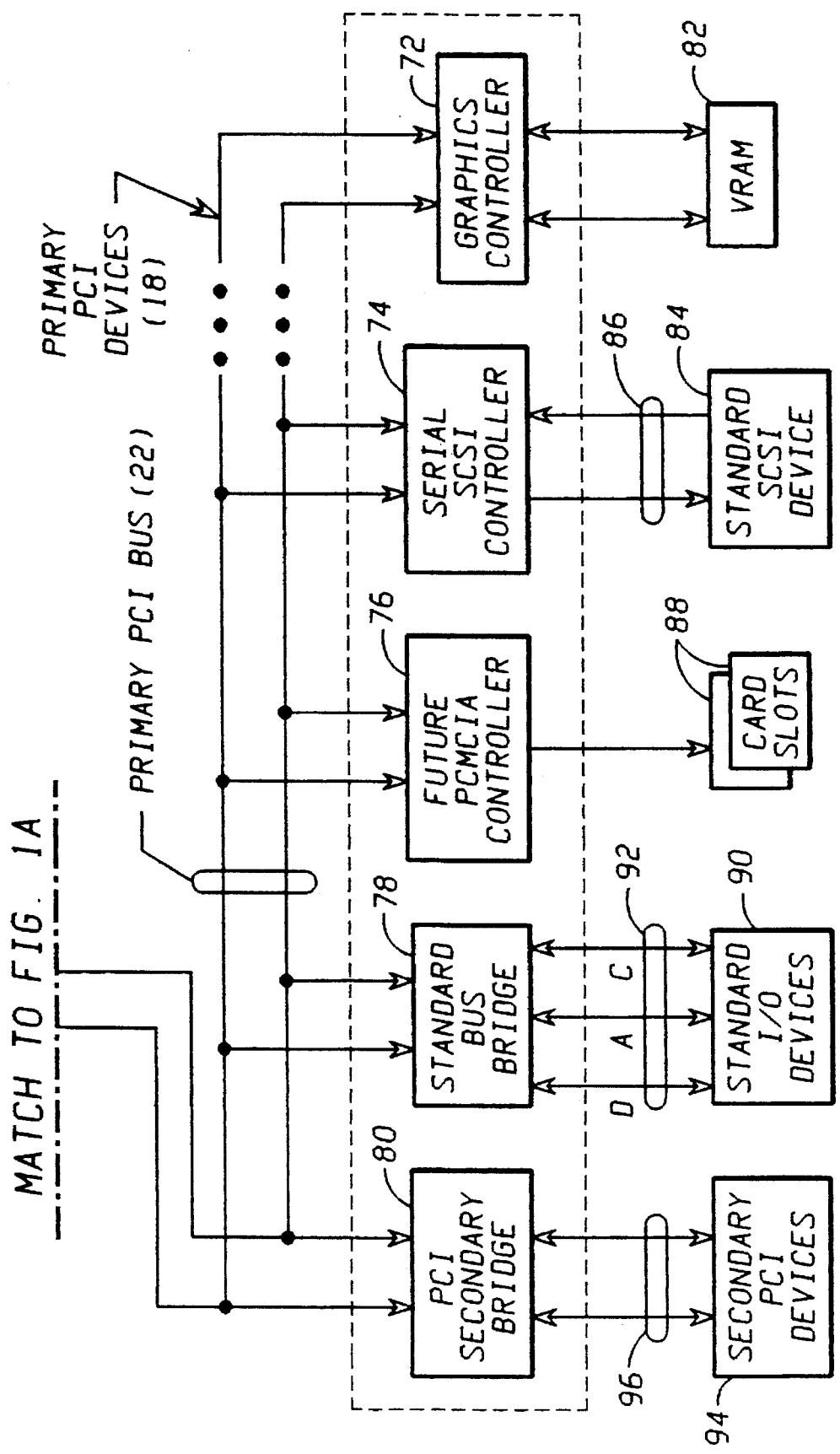

Referring now to FIGS. 1A–1C, a dual bus information handling system 10 is shown generally at 10, comprising, (i) a processor, cache and memory complex 12 connected to S-bus (system bus) devices 14 via an S-bus 16 and (ii) primary Peripheral Component Interconnect (PCI) devices 18 attached to one of the S-bus devices, a primary PCI host bridge 20, via a primary PCI bus 22. More detailed descriptions of the processor, cache and memory complex 12, the S-bus devices 14, the primary PCI devices 18, and the other elements shown in FIGS. 1A–1C will be provided hereinafter.

The processor, cache and memory complex 12 comprises a central processing unit (CPU) 24, a self-test circuit 26, a memory controller 28, a CPU cache 30, and base system memory 32. The CPU 24 in the preferred embodiment is a 32-bit microprocessor available from Intel, Inc. under the trade designation i486™, although it is contemplated that the system 10 may be implemented using other types of CPUs, especially x86-type microprocessors. The self-test circuit 26 provides a built-in-self-test (BIST) feature for the CPU 24 upon power-up. The self-test circuit also controls any self-test features which may be provided within each of the S-bus devices 14.

The CPU 24 is connected to the self-test circuit 26 and the memory controller 28 by a CPU local bus 34. The memory controller 28 is connected to the base system memory 32 by means of a base system memory bus 36. The memory controller 28 controls read and write operations to base system memory 32 over the base system memory bus 36, which operations are initiated by either the CPU 24 over the CPU local bus 34, or by a S-bus device 14 over the S-bus 16. Because the memory controller has the capability to manage operations on two buses, operations over the base system memory bus 36 and the CPU -local bus 34 may be managed simultaneously. The CPU local bus 34, the base system memory bus 36, and the S-bus are 32-bit buses, each of which buses comprises data, address and control information paths as is typical of such buses.

Base system memory 32 provides system-wide storage capability and may comprise either non-interleaved or interleaved memory cards. The CPU cache 30 permits short term storage of information contained within either base system memory 32 or expansion memory located elsewhere within the system 10. Such expansion memory could, for example, be located on the peripherally attached I/O devices within the system. The CPU cache 30 incorporates random access memory (RAM) which is used to temporarily store address locations of the base system memory 32 which are frequently accessed by the CPU 24. The CPU 24 accesses information stored in the CPU cache 30 directly, whereas access to information stored in the base system memory 32 must be handled by the memory controller 28.

All access to base system memory 32 is controlled by the memory controller 28 via base system memory bus 36. The memory controller initiates system memory cycles to the base system memory 32, during which cycles either the CPU 24 or one of the S-bus devices 14 has access to the base system memory via the memory controller 28. During a memory cycle directed to it, the memory controller 28 responds to the memory cycle. However, if the memory cycle is not directed to the memory controller 28, the information passes onto the S-bus 16. If the memory controller 28 determines that the operation it is managing is an I/O cycle, the memory controller propagates the information onto the S-bus 16 for access thereto by an S-bus device. If the I/O cycle is destined for a S-bus device, the appropriate S-bus device responds with a decode command to the memory controller. If the I/O operation is destined for a primary PCI device 18, the PCI host bridge 20 responds with a decode command to the memory controller and passes the I/O cycle to the appropriate primary PCI device.

A system clock module 38 provides a single clock signal for the S-bus devices 14, and a pair of clock signals for the CPU 24. In the preferred embodiment, the clock signal provided to the S-bus operates at 33 MHz. The two signals provided to the CPU 24 operate at 33 MHz and 66 MHz, respectively. The CPU 24 requires two clock signals because it operates internally at 66 MHz, but communicates over the CPU local bus 34 at 33 MHz.

Communications between the processor, cache and memory complex 12 and the S-bus devices are managed by the memory controller 28 over the 32-bit S-bus 16. Also attached to the S-bus, as shown in the preferred embodiment of FIGS. 1A–1C, are a direct memory access (DMA) controller 40, a system arbitration control point (SACP) 42, an input/output (I/O) controller 44, a PCMCIA controller 46, and a power management controller 48. An optional power management controller 50 may be attached to the power management controller 49 in case more sophisticated power management control is desired. A buffer 52 is provided on the S-bus 16 intermediate the DMA controller 40 and the I/O controller 44. As shown in FIGS. 1A–1C, however, it is contemplated that other S-bus devices 14, beyond those shown, may be attached to the S-bus 16.

The PCMCIA controller 46 is attached directly to PCMCIA card slots 54. Peripheral I/O devices 56 may be connected to the PCMCIA card slots 54 by means of buffers 58. The peripheral I/O devices 56 are controlled by the I/O controller 44. Attached to the I/O controller are a time-of-day clock 60 and a RAM module 62. The I/O controller 44 supports a variety of ports, including a mouse port 64, serial ports 66, a parallel port 68, and a keyboard port 70.

In addition to supporting S-bus devices 14 on the S-bus 16, the system 10 also supports a second high speed, high bandwidth bus, which in the preferred embodiment is the primary PCI bus 22. The PCI bus 22 is comprised of a new bus architecture called PCI. The primary PCI bus 22 is a high performance bus, meaning that it performs significant data transfer in a relatively short period of time, up to 120 megabytes of data per second. The PCI bus achieves this high level of performance, in part, because it may be directly linked to other high speed buses such as the S-bus 14, and thus may provide for a fast transfer of data between the CPU 24 or other S-bus devices 14 and the primary PCI devices 18. In fact, the operation of several high integration devices, such as certain graphics packages, require a direct link to a system bus such as the S-bus through a high performance bus like the PCI bus 22.

In addition, the PCI bus architecture does not require any "glue logic" to operate peripheral devices connected to it. Glue logic for other buses typically consists of miscellaneous hardware components such as a decoders, buffers or latches that are installed intermediate the peripheral devices and the bus.

The primary PCI bus 22 operates on a synchronous clock signal of 33 MHz, and the strings of data transmitted over the PCI bus are 32 bits long. A 32-bit data string on the PCI bus is called a double word (DWORD), which is divided into 4 bytes each comprised of 8 bits of data.

The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45–47 while standard non-multiplexed buses typically require twice this number. Accordingly, because the number of signals are reduced, the number of pins required to support a device linked to the PCI bus is also reduced a corresponding amount. PCI architecture is thus particularly adapted for highly integrated desktop computer systems.

A more detailed description of the structure and operation of PCI bus architecture is provided in "Peripheral Component Interconnect (PCI) Revision 1.0 Specification" published Jun. 22, 1992; "Preliminary PCI System Design Guide" revision 0.6, published Nov. 1, 1992; "Peripheral Component Interconnect (PCI) Add-in Board/Connector Addendum", (Draft) published 6 Nov., 1992; and, "Peripheral Component Interconnect (PCI) Revision 2.0 Specification," published Apr. 30, 1993, all by the PCI Special Interest Group, the contents of which references are incorporated herein by reference as if they were fully set forth.

Primary PCI devices 18 in the system 10 communicate with each other over the primary PCI bus 22. Primary PCI devices communicate with the CPU, cache and memory complex 12 and with other S-bus devices 14 residing on the S-bus 16 by means of the PCI host bridge 20, which is itself an S-bus device residing on the S-bus. The PCI host bridge 20, then, serves as an interface between the S-bus 16 and the primary PCI bus 22 and provides an effective means of communication between these two buses, and any peripheral devices which may reside on these buses.

The PCI host bridge 20 is a low latency interconnect mechanism through which the CPU 24 or other S-bus device 14 may directly access the primary PCI devices 18 or devices attached thereto. The bridge 20 also provides a high performance path which allows the primary PCI devices or devices attached thereto quick and direct access to base system memory 32. In addition, the host bridge 20 provides all of the hardware required to provide an interface between the S-bus 16 and the primary PCI bus 22 so that data may be transferred between these buses.

The primary PCI bus 22 is capable of supporting a variety of devices which are PCI compatible. As shown in FIGS. 1A–1C, these devices may include a graphics controller 72, a serial SCSI (small computer systems interface) controller 74, a future PCMCIA controller 76, a standard bus (e.g., ISA or MICRO CHANNEL® ("MC-A")) bridge 78, and a PCI secondary bridge 80. The devices shown in FIGS. 1A–1C attached to the primary PCI bus, however, are only one example of a system implementing a PCI bus architecture and thus the disclosed configuration and is not intended to limit the invention in any way.

The graphics controller 72 is typically provided with memory capability in the form of VRAM 82, which enables the graphics controller to buffer video frames therein, and may control any known graphics package which may be supported by PCI bus architecture. The SCSI controller 74 serves as an interface between SCSI devices 84 attached to a SCSI bus 86 and the primary PCI bus 22, and may control any SCSI device which may be supported by PCI bus architecture. The future PCMCIA controller 76 is attached to and controls card slots 88.

The standard bus bridge 78 serves as an interface between I/O devices 90 attached to a standard (e.g., MC-A or ISA) bus 92 and the primary PCI bus 22.

Secondary PCI devices 94 are connected to PCI bridge 80 via secondary PCI bus 96. Any number of unidentified secondary PCI devices 94 may be connected to the secondary PCI bus 96. The PCI bridge 80 serves as an interface between any number of PCI devices 94 attached to the secondary PCI bus 96 and the primary PCI bus 22.

Any number of peripheral devices compatible with the PCI bus architecture may be arranged on the primary PCI bus 22 with no other PCI buses present in the entire computer system 10; or any number of PCI peripheral devices could be attached to the primary PCI bus 22 with any number of secondary PCI buses, in addition to PCI bus 96, attached through the same number of separate, respective PCI bridges 80 to the primary PCI bus 22. Each secondary PCI bus could also have any number of additional PCI buses attached through PCI bridges to it and these "tertiary" PCI buses could have further PCI buses attached to them in various combinations. Similarly each PCI bus could have any number of PCI devices attached to it. Each connection between two PCI buses must be through a PCI bridge identical to bridge 80.

Furthermore, it is possible that a plurality of bridges identical to PCI host bridge 20 could be driven by the S-bus 16. Each of these host bridges could then have any number of PCI buses, bridges and devices connected to them in any arrangement that the designer of system 10 wishes. Thus, the portion of system 10 that is comprised of PCI bus architecture may be comprised of multiple buses and PCI peripheral devices arranged in various peer and hierarchical combinations (referred to hereinafter generally as a PCI network).

In addition, an alternate configuration of information handling system 10 eliminates S-bus 16 so that host bridge 20 connects primary PCI bus 22 directly to the CPU local bus 34. In this configuration, any of the S-bus devices 14 could be connected directly to the CPU local bus 34. Since S-bus 16 and CPU local bus 34 operate using the identical architectures, the invention, as described below, functions the same in this alternate embodiment as it does in the preferred embodiment described in FIGS. 1A–1C.

Figure 2:
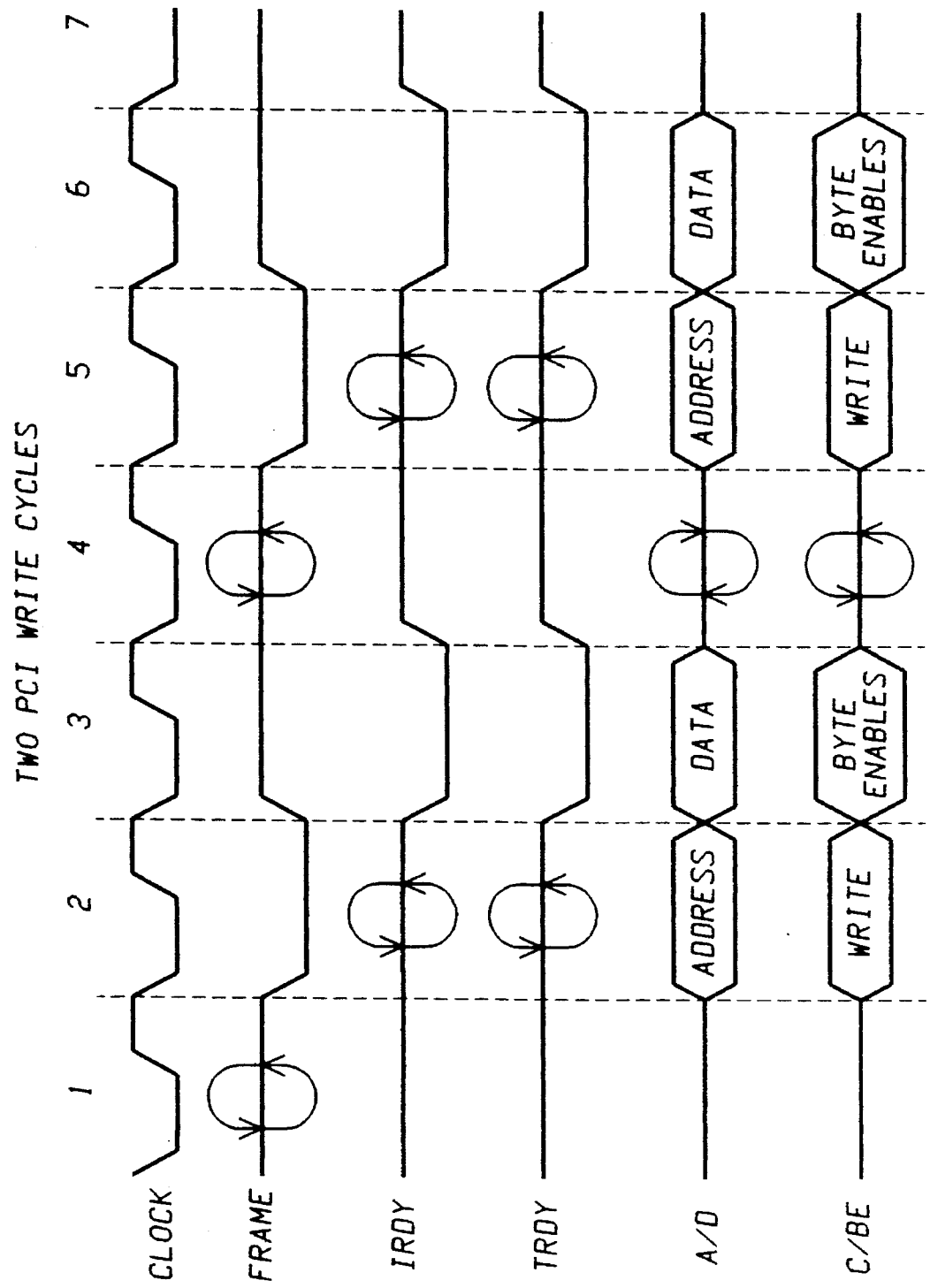
FIG. 2 is a timing diagram of two consecutive write cycles on a PCI bus.

Referring now to FIG. 2, a timing diagram of various PCI bus signals during two consecutive write cycles to a peripheral device attached to primary PCI bus 22 is shown. This peripheral device could be graphics controller 72, standard bus bridge 78 or any other peripheral device that can be driven from a PCI bus. Similarly, the write cycles shown in FIG. 2 are typical PCI bus write cycles and are not unique to primary PCI bus 22. They could be write cycles on secondary PCI bus 96 or any other PCI bus in the PCI network.

The clock signal (CLOCK) provides the timing for all communications on the PCI network. CLOCK is an input to every PCI device and all PCI bridges. CLOCK is synchronous, meaning that all communication signals in PCI architecture have a duration of at least one clock and any commands or data transfers are executed over the period of at least one clock. The signals in FIG. 2 are separated into individual "clocks" by the vertical dashed lines. Each dashed line represents the beginning of one clock duration and the end of the immediately preceding clock duration. The signals on each line are sampled or have their effective meaning on the rising edge of the clock signals.

The frame signal (FRAME) is used by any PCI bridge or peripheral device connected to the PCI bus to indicate that it is initiating a communication cycle, or an access, to another PCI bridge or peripheral device connected to the bus. The peripheral device or PCI bridge initiating an access is called a master, The device or component to which the access is directed is called a slave. In PCI bus architecture, many signals become enabled or are activated when they are driven from a higher voltage to a lower voltage, or driven "low". FRAME is one of those signals. Thus, when a master drives the FRAME low as shown in clock No. 2, a master is indicating to a slave that it is initiating an access.

The initiator ready signal (IRDY) is also activated when it is low and indicates when the master is ready for a data transfer to begin. Thus, the master drives IRDY low when it is ready to accept data during a read cycle or transfer data to the slave during a write cycle.

The target ready signal (TRDY) is activated low and indicates when a slave is ready for a data transfer to begin. Thus, the slave drives TRDY low when it is ready to accept data from the master during a write cycle or to transfer data to the master during a read cycle.

The address/data signal (AD) carries both the address of a register to which a data transfer is targeted and the data that is to be transferred multiplexed on one line. The address information is driven on AD by the master during an address phase when it asserts FRAME. During a data phase after the address phase, depending upon whether the access is a write cycle or a read cycle, the master or slave, respectively, will provide the data that is then driven on the AD line. The address phase has the duration of one clock, and the data phase is at least one clock but can be more than one clock if the data transfer is a burst transfer or the slave's assertion of TRDY is delayed.

The command/byte enable signal (C/BE) provides PCI bus commands and a byte enable signal multiplexed on one line. A bus command is asserted by the master when it asserts FRAME and during the address phase on AD. The bus command can either be a read or a write command depending upon which type of access the master is initiating.

The byte enable signals are present on C/BE during the data transfer on AD. The byte enable signals are contained in four bits having the identification numbers 0 through 3. When all of these four bits are activated low (the binary value of 0), they indicate that all four bytes or all 32 bits of data being transferred on AD are enabled and should be written during the transfer. When one of the four bits is a high (the binary value of 1), then one of the four bytes of data being transferred on the PCI bus is disabled.

The function of the various PCI bus signals during the simple write operation as shown in FIG. 2 is as follows:

During the second clock, a master drives FRAME low which means the master is initiating an access to a slave. IRDY and TRDY are in a turn around cycle during the second clock.

At this time, the master provides the address of the register in the slave to which the access is targeted on the AD line. Simultaneously, a write command is generated by the master on the C/BE line.

Moving on to the third clock, FRAME is deasserted, which means the access is ready to be completed. The master now has gained control of the IRDY line and drives it low, indicating the master is ready to transfer data to the slave. The slave has also gained control of the TRDY line and activates it low, indicating that it has decoded the address information as an address of a register within itself and is ready to accept data in that register. Thus, on the third clock, data is transferred on the AD line from the master into the slave in its decoded register.

After the address phase, when the data phase begins, the master asserts the byte enable signals on the C/BE line indicating whether the data is enabled. If one or more of the four bits are high, then the corresponding byte of data on the AD line is not enabled.

During the fifth clock the timing diagram repeats itself since another write cycle has been initiated. This second write cycle could be initiated by the same master or a different one. Similarly, the target of the write cycle could be the same slave or an entirely different one.

To eliminate any risk of contention between various devices connected to the PCI bus, each line goes through a turnaround cycle before the second write cycle is initiated. For a complete explanation of turnaround cycles and contention, see a co-pending application assigned to I.B.M. Corp., application Ser. No. 08/068,882, filed May 28, 1993, entitled "METHOD AND APPARATUS FOR PROVIDING BACK-TO-BACK DATA TRANSFERS IN AN INFORMATION HANDLING SYSTEM HAVING A MULTIPLEXED BUS" filed concurrently herewith.

Figure 3:
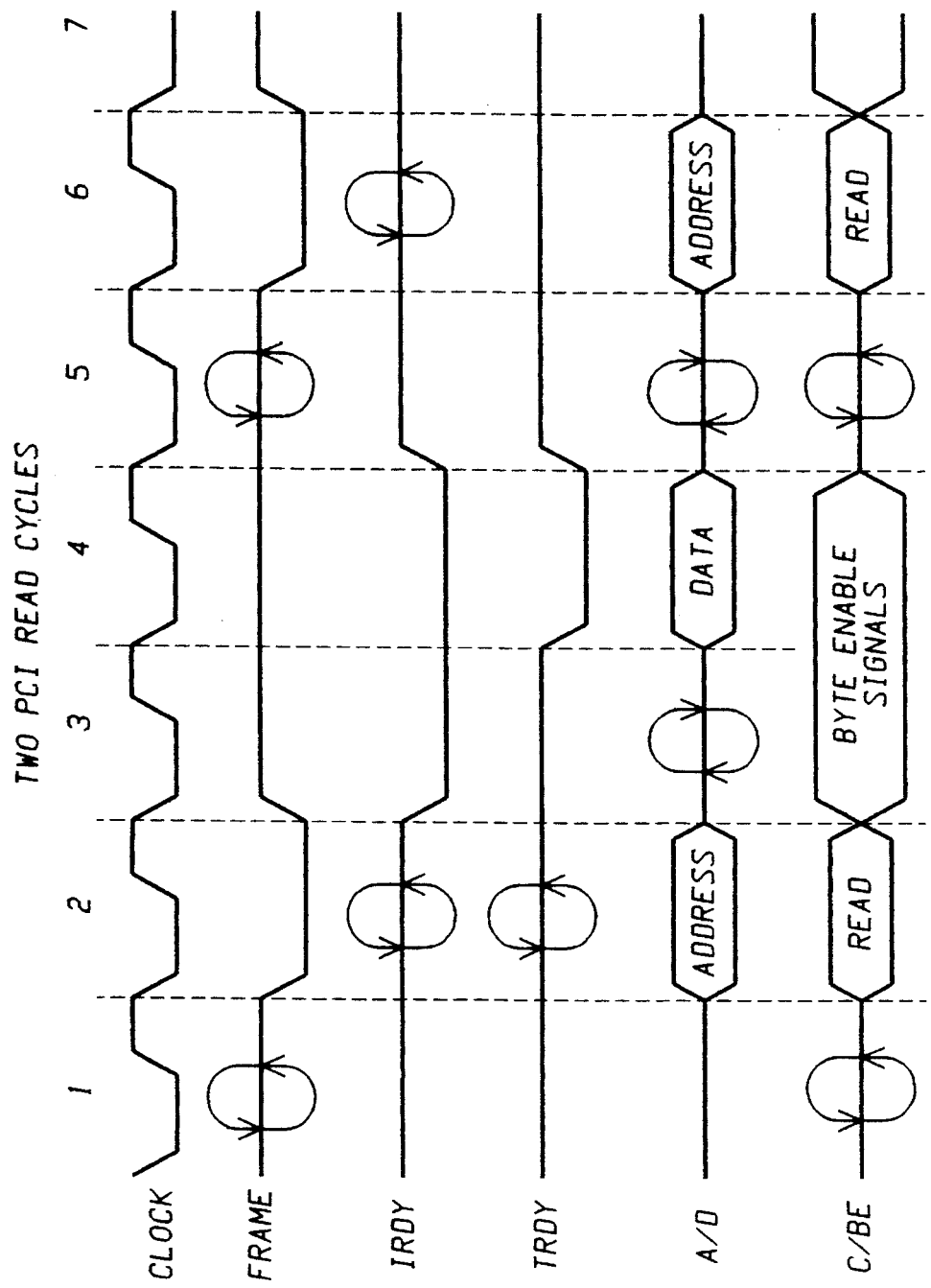
FIG. 3 is a timing diagram of two consecutive read cycles on a PCI bus.

Referring specifically now to FIG. 3, a timing diagram of a read cycle and the start of another read cycle is shown. During clock No. 2, the master asserts FRAME low. FRAME remains low for only one clock signal during clock No. 2 since this is a single data phase transfer. Address information is also supplied on AD by the master and a read command is transmitted on the C/BE line during clock No. 2.

In the third clock sequence, the AD line must go into a turnaround cycle because the slave has to take control of the AD line during the fourth clock signal to provide the data that the master has requested to read. This turnaround cycle is necessary to eliminate contention between the master and slave on the AD line. The master asserts IRDY low during clock No. 3 signalling it is prepared to read the requested data. During the third clock signal, the master also asserts the byte enable signals on the C/BE line.

During the fourth clock signal, the slave provides the data on the AD line and asserts TRDY. The byte enables are still asserted on the C/BE line by the PCI master. Since the IRDY signal remains low in the fourth clock, the data to be read is transferred from the slave to the master.

When a master connected to a PCI bus needs to execute a data transfer directed to a component or device connected to a CPU local bus or a system bus, for example a DMA controller or system memory, a two-step procedure must be used. During the first step, the host bridge that connects the PCI bus to the CPU local bus or system bus is a slave for a data transfer on the PCI bus. For the second step, the host bridge becomes a master for a read or write cycle, whatever the case may be, on the CPU local bus or system bus and the device or component to which the data transfer is targeted is a slave on the CPU local bus or system bus for this particular data transaction.

For instance, if graphics controller 72 targets a write cycle for DMA Controller 40, PCI host bridge 20 becomes a slave for a write cycle on primary PCI bus 22. The data to be written during the write cycle is then transferred to host bridge 20. Host bridge 20 then becomes the master for a write cycle on the S-bus 16 with DMA controller 40 as the slave or target of the write cycle. The data is then again transferred from the host bridge 20 to the DMA controller 40 during the write cycle on the S-bus 16. Read cycles operate in a similar two-step procedure wherein the host bridge 20 is the slave for a read cycle on the PCI bus 22, and then becomes the master for a read cycle on the S-bus 16 to complete the data transfer from the S-bus 16 back to the PCI bus 22.

Furthermore, if a master on the S-bus 16 initiates a data transfer to a device on the PCI bus 22, it must first use the host bridge 20 as a slave. Then the host bridge 20 becomes the master for the data transfer on the PCI bus 22.

Data transfers between devices connected to PCI buses below PCI bridge 80 in the PCI network and components connected to the CPU local bus 34 or S-bus 16 must be completed by performing consecutive data transfers to and from the PCI bridges connecting the network together until the data is finally transferred to host bridge 20. Once PCI bridge 80 has the data to be transferred, if the particular transfer is a write cycle, then the two-step procedure set forth above is used to complete the data transfer with PCI bridge 80 used as a master on the PCI bus 22 and host bridge 20 being a slave on the PCI bus 22 and a master on the S-bus 16.

Data transfers between the S-bus 16 and the PCI bus 22 must be completed in two-steps because they have different bus architectures. The bus architectures of the CPU local bus 34 and S-bus 16 are the same. In the bus architecture of CPU local bus 34 and S-bus 16, data and address information are not multiplexed as in the PCI bus architecture; they are transmitted on separate lines. The strings of data and address information on these lines are 32 bits in length.

The CPU local bus architecture does have a byte enable line, which performs the identical function of the byte enable signals in PCI bus architecture. Thus, the byte enable signals in CPU local bus architecture are four bits in length and indicate whether a particular byte of the data on the data line is enabled or not enabled.

The CPU local bus 34 and S-bus 16 use the CLOCK signal from PCI bus 22 as a timing signal. Each duration of the timing signal on the CPU local bus 34 and S-bus 16 is called a bus cycle.

Unlike PCI bus architecture, the data and address information of CPU local bus 34 and S-bus 16 are transmitted on separate lines. Thus, once the slave to which a data transfer is targeted responds to the address transmitted on the address line, the data transfer can be completed in one bus cycle on the CPU local bus. During a burst transfer of several 32-bit strings of data to consecutive addresses, once the slave responds for the first transfer, each of the subsequent data transfers can be completed in a single bus cycle. During a data transfer, the master generates the byte enable signals on the CPU local bus.

Referring to FIG. 2, if the write cycle illustrated in clock Nos. 2 through 4 is ultimately targeted for a component connected to the S-bus 16, the host bridge 20 is the slave to which the PCI write cycle is directed. Accordingly, host bridge 20 receives the data transmitted in the third clock in one of its internal registers by responding to the address transmitted in the second clock. This address would also be stored in one of its internal registers.

Then, once it gains control of the S-bus 16, the host bridge 20, acting as a master, generates a write cycle on the S-bus 16. During the first bus cycle, the host bridge 20 transfers the same address information and byte enable signals it received during the PCI write cycle onto their respective lines on the S-bus 16. The appropriate slave responds to the address information and the data is transferred on the address line during the next bus cycle after this response.

The data on a PCI bus during either a read or write cycle may be non-contiguous. Non-contiguous data is when two or more enabled bytes of data within a 32-bit data string are separated by a byte or bytes of data that are not enabled. The four bits of the byte enable signals indicate whether data is disabled, and thus, non-contiguous. The following chart, identified as Table 1, shows each possible binary combination of the four byte enable bits and whether each combination indicates non-contiguous data:

TABLE 1

| Byte Enables | 0000 | 0001 | 0010 | 0011 | 0100 | 0101 | 0110 | 0111 | 1000 | 1001 | 1010 | 1011 | 1100 | 1101 | 1110 |
|---|---|---|---|---|---|---|---|---|---|---|---|---|---|---|---|
| Non-contiguous | No | No | Yes | No | Yes | Yes | Yes | No | No | No | Yes | No | No | No | No |

The architectures of CPU local bus 34 and S-bus 16 cannot transfer data that is non-contiguous within a single data transfer without causing a malfunction in the information handling system. Thus, before host bridge 20 can transfer data from PCI bus 22 onto the S-bus 16, it must determine whether the data is non-contiguous and, if so, convert the non-contiguous data to contiguous data. The hardware that embodies the present invention performs this task.

The method by which the invention described below converts the non-contiguous data to contiguous data is by separating a single non-contiguous data transfer on the PCI bus 22 into two or more transfers of contiguous data on the S-bus 16. For example, if the non-contiguous data from a master connected to the primary PCI bus 22 has the byte enable value of 0110 and the master is writing this data into a slave connected to S-bus 16, then the invention, which is hardware included within the host bridge 20, will generate two write cycles on the S-bus 16 with the byte enable values of 1110 and 0111, respectively. The addresses and data for both of these write cycles will be identical. This will cause the first and fourth bytes of data, which are enabled, to be transferred, and the disabled second and third bytes of data not to be transferred.

The invention also simultaneously addresses and solves the communication problems between 8-bit and 16-bit devices connected to a CPU local bus or system bus and the devices connected to a PCI bus, which only transfer data in 32-bit length strings. The invention solves this problem by again breaking up a 32-bit data transfer on the PCI bus into a plurality of data transfers on the CPU local bus or system bus.

For example, if a write cycle from a master connected to the primary PCI bus 22 is directed to a slave attached to the S-bus 16 that only accepts data in 8-bit strings, then the 32-bit data string from the master must be divided into four write cycles on the S-bus 16, assuming all of the data is enabled. The byte enable signals for each of the four transfers is changed as the bytes of data are transferred to the slave. The byte enable signal of the first write on the S-bus 16 will be 0000 indicating all 4 bytes of data are enabled. However, only the lowest ordered byte of data is received by the slave because it is an 8-bit device. Accordingly, a second write cycle is generated by the invention in the host bridge 20 having the byte enable signal of 0001 because the lowest ordered byte of data will have already been transferred to the slave. As each byte of the data is transferred in the successive write cycles, the byte enable value of the third write cycle will change to 0011 and the byte enable signal of the fourth write cycle will change to 0111.

The chart set forth below, identified as Table 2, indicates whether an additional data transfer on the CPU local bus or system bus is required after a single data transfer depending upon the bit size of the slave and the byte enable signal of the particular data transfer. The chart also indicates the byte enable value of the next data transfer.

TABLE 2

| Current Byte Enables | 8 or 16 bit Device | Another bus cycle | Next Byte Enables |
|---|---|---|---|
| 0000 | 8 | Yes | 0001 |
| 0001 | 8 | yes | 0011 |
| 1000 | 8 | Yes | 1001 |
| 0011 | a | Yes | 0111 |
| 1001 | 8 | Yes | 1011 |
| 1100 | 8 | Yes | 1101 |
| 0111 | 8 | No | 1111 |
| 1011 | 8 | No | 1111 |
| 1101 | 8 | No | 1111 |
| 1110 | 8 | No | 1111 |
| 0000 | 16 | Yes | 0011 |
| 0001 | 16 | Yes | 0011 |
| 1000 | 16 | Yes | 1011 |
| 0011 | 16 | No | 1111 |

The invention described below implements this chart in the hardware of a host bridge, for example host bridge 20.

Figure 4A:
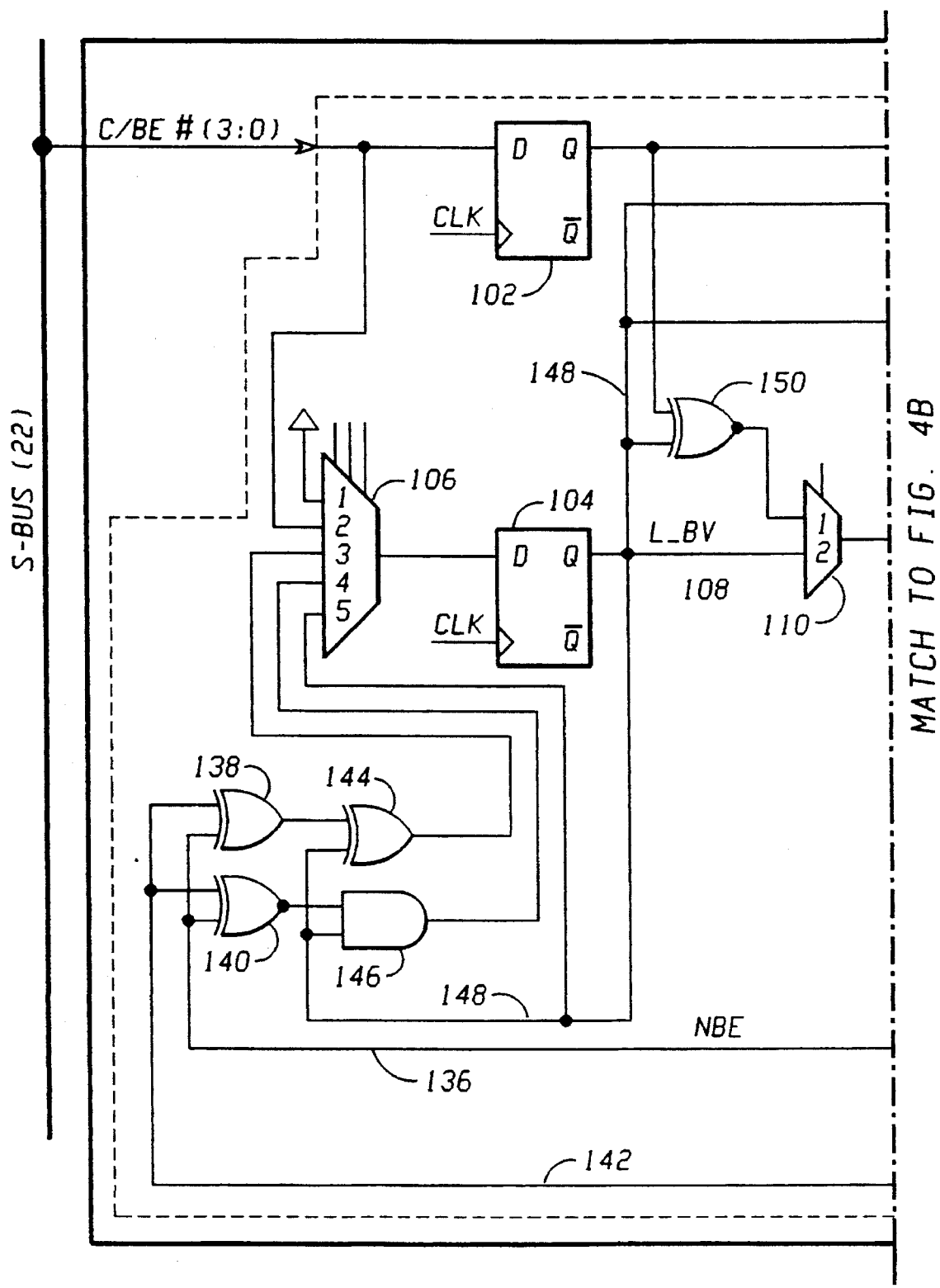
FIG. 4 is a logic diagram of byte enable control hardware within a host bridge.
Figure 4B:
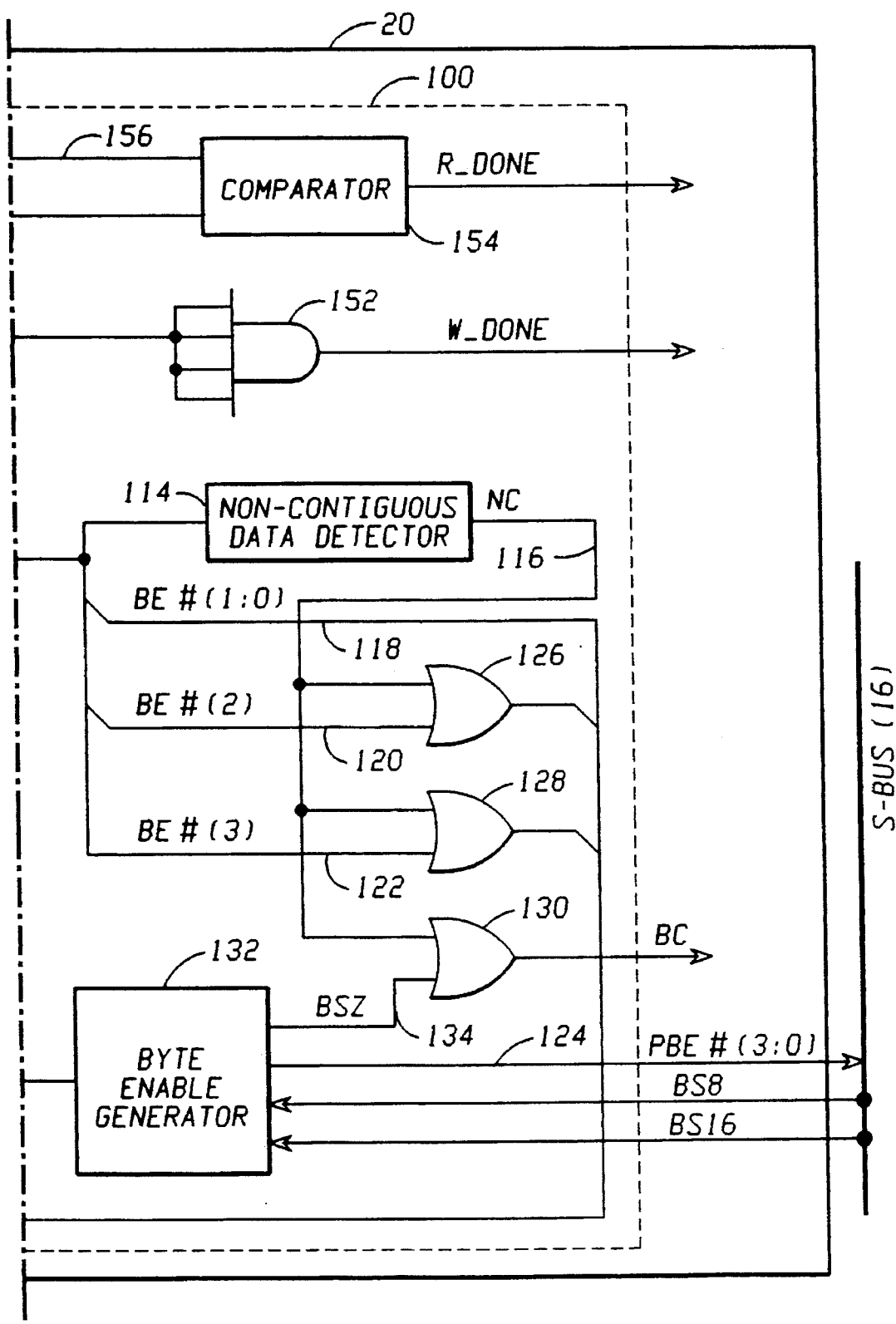

Referring now to FIG. 4, a diagram of the inventive byte enable control hardware 100 within host bridge 20 is shown. Hardware 100 includes a first latch register 102 connected to the C/BE line of the PCI bus 22 and a second latch register 104. Latch register 104 is connected to a five input multiplexor 106. Latch register 104 has an output line 108 through which it is connected to a two input multiplexor 110.

Latch registers 102 and 104 each have a capacity to hold 4 bits of data, and latch and hold a 4-bit value for one clock signal. Latch register 102 receives the 4-bit, byte enable signal from the C/BE line of PCI bus 22 for a particular data transfer and latches the signal until that particular data transfer is complete on S-bus 16.

Latch register 104 receives a 4-bit, output signal from multiplexor 106 and holds this value until multiplexor 106 generates another output signal. Latch register 104 outputs its present 4-bit value on line 108 to a second input of multiplexor 110. The output from latch register 104 is called the latched byte valid (L_BV).

Multiplexor 106 has five inputs numbered 1 through 5 that its internal logic selects to be driven on its output depending upon the status of the data phases on both the PCI bus 22 and S-bus 16. Each of these inputs is a 4-bit value. Multiplexor 106 receives the status of the data transfers on these buses through the hardware of host bridge 20. The status of the data phases on PCI bus 22 and S-bus 16 which causes the multiplexor 106 to select each of its five inputs is as follows:

Input No. 1—selected when a the host bridge 20 initially responds to a read data transfer on PCI bus 22 and a data transfer on S-bus 16 has been completed and another data transfer is ready to begin. Input No. 1 is always the binary value of "1111".

Input No. 2—selected when a write data transfer begins on the PCI bus 22 and before the first bus cycle on S-bus 16 that is required to complete the corresponding write data transfer on the S-bus 16 has begun. Input No. 2 is the 4-bit byte enable value from the C/BE line of PCI bus 22.

Input No. 3—selected when the data transfer to be completed on S-bus 16 is a write operation initiated from PCI bus 22 and a bus cycle of the transfer on S-bus 16 has just completed.

Input No. 4—selected when the data transfer to be completed on S-bus 16 is a read operation and a bus cycle of the transfer on S-bus 16 has just completed.

Input No. 5—selected and maintained during any bus cycle on S-bus 16 until the bus cycle is completed. This input is feedback from the output of latch register 104.

Multiplexor 110 has two inputs that it selects to be driven on its output depending upon whether the data transfer initiated by the PCI bus 22 is a read operation or a write operation. Each of these inputs is 4-bits in length. The first input is selected during a PCI read data transfer and the second input is selected during a PCI write data transfer. Multiplexor 110 monitors the status of data transfers on both PCI bus 22 and S-bus 16 through the hardware of host bridge 20.

The output of multiplexor 110 is connected to a non-contiguous data detector 114 which detects whether the byte enables of the data to be transferred during the next bus cycle on S-bus 16 are non-contiguous. Detector 114 is a function block combination of hardware logic that provides the function of Table 1 set forth above. Thus, detector 114 determines whether the data to be transferred during the next bus cycle is non-contiguous and generates a binary "1" on an output line 116 if the data is, in fact, non-contiguous. The output of detector 114 is labeled NC.

The four bits of the output of multiplexor 110 are also divided into three individual signals on lines 118, 120 and 122, respectively. The two lower ordered bits, the bits having the identification numbers of 0 and 1, are output on line 118 which is connected to a line 124 which is in turn connected to S-bus 16. The bit of the output of multiplexor 110 having the identification number of 2 is output on line 120 and becomes an input to a first, two-input OR gate 126. The bit of the output of multiplexor 110 having the identification number of 3 is output on line 122 and becomes an input to a second, two-input OR gate 128.

The NC output of detector 114 is also input to OR gates 126 and 128. The outputs of OR gates 126 and 128 are connected to line 124.

Line 124 transmits a 4-bit signal, PBE, to S-bus 16 that combines the outputs of the two OR gates 126 and 128 and the bits numbered 0 and 1 from the output of multiplexor 110. This 4-bit signal is the byte enable signal for the present bus cycle on S-bus 16 and will always be contiguous.

The NC output from detector 114 is also input to a third, two-input OR gate 130. The other input to OR gate 130 is connected to a byte enable generator 132 through line 134. The output from generator 132 on line 134 is labeled BSZ. OR gate 130 has an output labeled BC which is connected to other hardware within host bridge 20.

Generator 132 is a function block of known logic hardware that provides the function of generating Table 2 set forth above. Thus, generator 132 determines if another bus cycle is required on S-bus 16 to complete a particular data transfer initiated by PCI bus 22 and provides the byte enable signals for that transfer. The outputs from generator 132 depend upon whether the slave to which the data transfer is directed is an 8-bit or 16-bit device.

Generator 132 is connected to S-bus 16 through two input lines label BS8 and BS16. The BSZ, BS8 and BS16 signals are single bit, binary signals that may have the value of 0 or 1. Once the slave connected to S-bus 16 to which the data transfer is directed responds to complete the data transfer, it transmits a binary signal on BS8 or BS16 depending upon whether it is an 8-bit or 16-bit device, respectively. If it is not an 8-bit or 16-bit device then values of BS8 and BS16 are 1. If BS8 or BS16 have a value of 0, then the slave is an 8-bit or 16-bit device, respectively, and generator 132 generates a binary 1 on line 134 for the value of BSZ.

If either of the NC or BSZ signals have a value of 1, then OR gate 130 generates a high value for the BC signal. A high BC signal indicates to other hardware within host bridge 20 that at least one more bus cycle is required to complete the present data transfer.

Generator 132 has another input from line 124 which is the byte enable signal for the present bus cycle on S-bus 16. Generator 132 generates the byte enable value for the next bus cycle based upon the present byte enable value.

Generator 132 has a second output labeled NBE which is output on a line 136. NBE is a 4-bit value. NBE is either given the value of the byte enable signal for the next bus cycle, or has the value of "1111" if no further bus cycles on S-bus 16 are required to complete the data transfer initiated by PCI bus 22 because the slave is an the 8-bit or 16-bit device.

The NBE signal is one input to a two-input exclusive OR gate (XOR) 138 and a two-input, inverted exclusive OR gate (NXOR) 140. The other input to both XOR gate 138 and NXOR gate 140 is the value of the byte enable signal for the present bus cycle on S-bus 16 from line 124, which is connected to XOR gate 138 and NXOR gate 140 through line 142.

The output of XOR gate 138 is connected to one input of a fourth, two-input OR gate 144. The output of NXOR gate 140 is connected to one input of a two-input AND gate 146. The other input to both OR gate 144 and AND gate 146 is the output of latch register 104 as feedback through a line 148. The output of OR gate 144 is connected to input No. 3 of multiplexor 106. The output of AND gate 146 is connected to input No. 4 of multiplexor 106.

The output from latch register 104 is also connected through line 148 to a second, two-input NXOR gate 150, a four-input AND gate 152 and a comparator 154. The four inputs of AND gate 152 are the four bits of the L_BV signal from latch register 104. The output of AND gate 152 is output to other hardware within host bridge 20 and indicates when a write cycle initiated by the PCI bus 22 has been completed on the S-bus 16. This output is labeled W_DONE and is a binary 1 when activated.

The other input to NXOR gate 150 is the output of latch register 102. Once again, this output is the value of the byte enable signals from the data transfer initiated on PCI bus 22. This value remains constant until the data transfer is complete on S-bus 16. The output of NXOR gate is connected to the first input of multiplexor 110.

The output from latch register 102 is also connected to comparator 154. Comparator 154 compares this value to the L_BV value it receives through line 148. When these two values are equal, comparator 154 generates a binary 1 value on its output which is connected to other hardware within host bridge 20. This output is labeled R_DONE and indicates when a read data transfer initiated by PCI bus 22 is complete on S-bus 16.

The operation of hardware 100 is different depending upon whether the data transfer initiated by the master attached to PCI bus 22 (PCI master) is a read or a write transfer. In operation during a read transfer, the PCI master initiates a read cycle targeted for the S-bus 16 on PCI bus 22 and the host bridge 20 responds as the slave. The byte enable signals from the PCI master are latched into latch 102 and are input to comparator 154 and NXOR gate 150.

Since the read transfer on the S-bus 16 has not yet begun, multiplexor 106 outputs input No. 1 which is the 4-bit binary value of "1111". This value is then latched into latch register 104 and output on line 148 to NXOR 150 as the L_BV signal.

NXOR gate 150 then generates a 4-bit output value based on the inverted exclusive OR combination of the byte enable signals from PCI bus 22 latched in latch register 102 and the value of L_BV. Because the present transfer is a read operations multiplexor 110 selects the output from NXOR 150 to be driven on its own output throughout the data transfer.

Detector 114 then determines if the output from multiplexor 110 is non-contiguous and, if so, activates its output signal, NC, on line 116, by driving it to a value of binary 1. When NC is activated, the output of OR gates 126 and 128 will be high ensuring that bit numbers 2 and 3 of the PBE signal on line 124 are logical 1's. Thus, PBE will always be contiguous. As stated above, the values for bit numbers 0 and 1 of PBE are simply the bit numbers 0 and 1 from the output of multiplexor 110.

The PBE signal is then transmitted on line 124 to S-bus 16 as the byte enable signals for the present bus cycle. When the slave connected to the S-bus 16 to which the read transfer is directed responds for the data transfer, it may generate a binary 0 on the BS8 or BS16 lines, signalling that the slave is a 8-bit or 16-bit device, respectively. Based upon the values of BS8, BS16 and the PBE signal, generator 132 will generate the NBE signal on line 136 in accordance with Table 2 set forth above.

If either BS8 or BS16 is enabled to a binary 0 and generator 132 determines that another bus cycle on S-bus 16 is required to complete the read data transfer, then generator 132 will generate a binary high signal for BSZ on line 134. This will cause OR gate 130 to generate a high signal for BC which signals to other hardware within host bridge 20 that another bus cycle is required to complete the data transfer. Similarly, if detector 114 generates a high value for NC on line 116, OR gate 130 will drive BC to a binary high value indicating another bus cycle is required to complete the data transfer.

Once the NBE signal is generated, it is input to NXOR gate 140 along with PBE signal from line 142. The resulting 4-bit binary value output by the NXOR gate 140 is input to AND gate 146 along with the feedback signal from the output of latch register 104. The AND gate 146 performs a logical AND operation on these two signals and outputs the result which is connected to the fourth input of multiplexor 106. Since this is a read data transfer and the first bus cycle of the data transfer on the S-bus 16 has completed, the multiplexor 106 selects its input No. 4 to be driven on its output.

This new output from multiplexor 106 is latched into latch register 104 and becomes the next L_BV signal. The process is then repeated for this new L_BV signal.

The process continues to repeat itself for each new value of L_BV until all of the data as indicated by the byte enable signals from the C/BE line of PCI bus 22 has been transferred. When this occurs, the L_BV value will be equal to the byte enable signals from PCI bus 22. Both of these signals are constantly input to comparator 154 and when they are equal, comparator 154 activates R_DONE to a high which signals to the S-bus 16 and the host bridge 20 that the data transfer is complete. When this occurs, all of the data will have been read from the slave connected to S-bus 16.

The operation of byte enable hardware 100 during a write transfer is different from its operation during a read transfer in several respects. The master connected to PCI bus 22 begins by initiating a write cycle targeted for the S-bus 16. The byte enable signals from the PCI bus 22 are input at input No. 2 of multiplexor 106. Since the first bus cycle of the data transfer has not yet started on S-bus 16 and this is a write operation, multiplexor 106 selects the signal on its input No. 2 to be driven on its output. Thus, latch 104 latches the value of the byte enable signals from PCI bus 22 and these signals become the value of L_BV.

Since this is a write transfer, multiplexor 110 selects the signal on its input No. 2 to be driven on its output which is L_BV. L_BV is then output to detector 114 and divided on lines 118,120 and 122. Detector 114 and OR gates 126 and 128 provide the identical function they provide for a read operation; generating the PBE signal on S-bus 16 and ensuring that it is contiguous. Similarly, generator 132, BS8 and BS16 generate the NBE signal operating in the same manner as they do for a read transfer and OR gate 130 provides the same function of generating the BC signal.

Once generator 132 generates the NBE signal, it is input through line 136 to XOR gate 138 along with the PBE signal. XOR gate 138 performs an exclusive OR operation on the PBE and NBE signals and outputs the result to the input of OR gate 144. OR gate 144 also receives an input signal from feedback line 148 which is the L_BV signal. OR gate 144 performs an OR operation on the two signals input to it and outputs the results to input No. 3 of multiplexor 106.

Multiplexor 106 selects the signal on input No. 3 to transmit on its output because the present data transfer is a write operation and the first bus cycle of the data transfer on S-bus 16 has completed. The output of multiplexor number 106 is latched into latch register 104 and becomes the new value for L_BV.

This new value for L_BV is then input into the second input of multiplexor 110 and the entire process repeats itself. The process will repeat until the value of L_BV has a binary value equal to "1111". When this occurs, then all of the data will have been transferred from the PCI bus 22 to the slave connected to the S-bus 16.

When L_BV is equal to "1111" then AND gate 152 will activate W_DONE. This indicates to the S-bus 16 and the slave connected to the bus that the data transfer is complete.

An example of the operation of the hardware 100 during a write operation with the byte enable signals from PCI bus 22 equal to "0100" directed to an 8-bit slave is as follows:

The byte enable signals of "0100" are transmitted to input No. 2 of multiplexor 106. Multiplexor 106 outputs this same signal to latch register 104 which outputs an L_BV signal equal to "0100". Multiplexor 110 inputs and outputs this signal to detector 114.

Detector 114 determines that L_BV is non-contiguous and outputs a signal of 1 for NC. Because NC is equal to 1, OR gates 126 and 128 cause PBE on line 124 to be equal to "1100". This signal is transmitted on S-bus 16 as the byte enable signals for the first bus cycle.

The slave to which the write is directed responds with a low signal on BSS, which causes generator 132 to generate an NBE signal of "1101" since only the data corresponding to bit number 0 of the PBE signal was transferred during the first bus cycle. Generator 132 also causes BSZ to become high, which, along with the high NC signal, cause OR gate 130 to generate a high signal on BC indicating the need for at least another bus cycle to complete the transfer.

PBE and NBE are input to XOR gate 138, which performs an exclusive OR operation and generates an output equal to "0001". OR gate 144 then performs an OR operation with the output from XOR gate and the feedback value from latch 104 as inputs The result of this operation is "0101" which is transmitted to input No. 3 of multiplexor 106 and output from multiplexor 106 to latch register 104. This value now becomes the value for L_BV.

Thus, "0101" is transmitted through the second input of multiplexor 110 to detector 114, which again determines that this value is non-contiguous and causes NC to be equal to 1. This causes OR gates 126 and 128 and line 118 to generate a PBE equal to "1101" on line 124 for the second bus cycle on S-bus 16. The NC signal also causes OR gate 130 to enable the BC signal indicating to the host bridge 20 that yet another bus cycle is required to complete the data transfer. During the second bus cycle, the byte of data corresponding to bit number 2 of the byte enable signals, PBE, will be transferred to the slave.

The slave again responds with a low signal on BSS. Accordingly, generator 132, pursuant to Table 2, does not activate the BSZ signal and generates a NBE signal of "1111" on line 136.

This value is input to XOR gate 138 along with the value of PBE. Accordingly, XOR gate 138 generates an output of "0010" which is input to OR gate 144 with the present value of L_BV through feedback line 148. OR gate 144 responds by outputting a value equal to "0111" to input No. 3 of multiplexor 106 which becomes the next value of L_BV.

Detector 114 determines that the new value of L_BV is contiguous and does not enable NC. Thus, the value of L_BV is simply passed on to line 124 as the new value for PBE unaffected by OR gates 126 and 128. A third bus cycle is then generated on S-bus 16 that completes the data transfer with the byte enable signal equal to the present value of PBE or "0111".

The slave responds by activating BSS, however, generator 132 does not activate the BSZ signal and again generates a value of "1111" for NBE on line 136. The ultimate output of the logical operations performed by XOR gate 138 and OR gate 144 is now "1111" which is input to input No. 3 of multiplexor 106 and output to latch register 104. The value of L_BV thus becomes "1111" which causes AND gate 152 to generate a high signal for W_DONE which ends the data transfer.

If the example set forth above was a read data transfer, the same byte enable values for PBE would be used for the bus cycles on S-bus 16. However, as set forth above, they would have been derived in a different manner. This is because the read "path of logic" in hardware 100 would have been used instead of the write path of logic.

Accordingly, the preferred embodiment of a method and apparatus for providing accurate and complete communication between different bus architectures in an information handling system has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

I claim:

1. An information handling system, comprising:

a central processing unit;

a system bus connected to said central processing unit;

a peripheral bus for connecting peripheral devices thereto, said peripheral bus able to transfer data strings each of which has a predetermined bit width defining a plurality of data substrings, each of said plurality of data substrings comprising a plurality of data bits, said peripheral bus including a first enable/non-enable signal which indicates which of said data substrings within a particular data string for a single peripheral bus cycle contain valid data and which of said data substrings within said particular data string contain invalid data; and a host bridge for connecting said system bus to said peripheral bus, said host bridge having associated therewith a logic network which is responsive to said first enable/non-enable signal on said peripheral bus to (i) detect whether said particular data string for a single peripheral bus cycle to be transferred from said peripheral bus to said system bus is incompatible for transfer over said system bus in that it contains at least two valid data substrings separated by at least one invalid data substring, and (ii) convert an incompatible data string into two or more system bus compatible data strings for transference over said system bus in two or more system bus cycles, wherein each of said two or more system bus compatible data strings does not contain at least two valid data substrings separated by at least one invalid data substring, before said data is transferred from said host bridge over said system bus.

2. The information handling system of claim 1, wherein said logic network is implemented in hardware form within said host bridge.

3. The information handling system of claim 1, wherein said logic network includes a generator for generating a second enable/non-enable signal for each of said two or more system bus compatible data strings based upon (i) said first enable/non-enable signal and (ii) the bit width of a slave connected to the system bus to which said two or more system bus compatible data strings are transferred.

4. The information handling system of claim 3, wherein said logic network includes a first logic path for converting said incompatible data string to said two or more system bus compatible data strings during a write transfer from said peripheral bus to said system bus and a second logic path for converting said incompatible data string to said two or more system bus compatible data strings during a read transfer from said peripheral bus to said system bus.

5. The information handling system of claim 4, wherein said logic network includes at least one multiplexor for selecting either said first logic path or said second logic path.

6. The information handling system of claim 1, wherein said peripheral bus conforms to PCI bus architecture.

7. The information handling system of claim 1, wherein said peripheral bus has both data and corresponding memory address information multiplexed on a single bus line.

8. The information handling system of claim 1, wherein a peripheral device connected to said peripheral bus initiates a transfer of said particular data string from said peripheral bus to said system bus.

9. The information handling system of claim 1, wherein each of said two or more system bus compatible data strings are sequentially transferred from said host bridge to said system bus in direct correspondence with two or more bus cycles of said system bus.

10. A method of transferring data, in an information handling system having a system bus and a peripheral bus connected by a host bridge, between a peripheral device connected to the peripheral bus and a component connected to the system bus, wherein the peripheral bus is able to transfer data strings each of which has a predetermined bit width defining a plurality of data substrings, each of said plurality of data substrings comprising a plurality of data bits, and wherein the peripheral bus includes a first enable/non-enable signal which indicates which of the data substrings within a particular data string for a single peripheral bus cycle contain valid data and which of the of data substrings within the particular data string contain invalid data, said method comprising the steps of:

(i) detecting, in response to said first enable/non-enable signal on said peripheral bus, whether the particular data string for a single peripheral bus cycle to be transferred from said peripheral bus to said system bus is incompatible for transfer over said system bus in that it contains at least two valid data substrings separated by at least one invalid data substring;

(ii) converting an incompatible data string to two or more system bus compatible data strings, wherein each of said two or more system bus compatible data strings does not contain at least two valid data substrings separated by at least one invalid data substring; and (iii) transferring each of said two or more system bus compatible data strings from said peripheral bus over said system bus in two or more system bus cycles.

11. The method of claim 10, further including the step of generating a second enable/non-enable signal for each of said two or more system bus compatible data strings based upon (i) said first enable/non-enable signal and (ii) the bit width of a slave connected to the system bus that receives said two or more system bus compatible data strings.

12. The method of claim 10, wherein said peripheral bus conforms to PCI bus architecture.

13. The method of claim 10, wherein said peripheral bus has both data and corresponding memory address information multiplexed on a single bus line.

14. A host bridge for connecting a system bus to a peripheral bus in an information handling system, the peripheral bus able to transfer data strings each of which has a predetermined bit width defining a plurality of data substrings, each of said plurality of data substrings comprising a plurality of data bits, the peripheral bus including a first enable/non-enable signal which indicates which of the data substrings within a particular data string for a single peripheral bus cycle contain valid data and which of the of data substrings within the particular data string contain invalid data, the host bridge comprising:

a detector which is responsive to said first enable/non-enable signal on said peripheral bus for determining whether the particular data string for a single peripheral bus cycle to be transferred from said system bus to said peripheral bus is incompatible for transfer over the system bus in that it contains at least two valid data substrings separated by at least one invalid data substring; and a logic network for (i) converting an incompatible data string to two or more system bus compatible data strings, wherein each of said two or more system bus compatible data strings does not contain at least two valid data substrings separated by at least one invalid data substring, and (ii) sequentially transferring each of said two or more system bus compatible data strings from said peripheral bus over said system bus in direct correspondence with two or more bus cycles of said system bus.

15. The host bridge of claim 14, wherein said peripheral bus conforms to PCI bus architecture.

16. The host bridge of claim 14, wherein said peripheral bus has both data and corresponding memory address information multiplexed on a single bus line.

17. The information handling system of claim 1, wherein both said system bus and said peripheral bus have 32 bit bandwidths.

18. The method of claim 10, wherein both said system bus and said peripheral bus have 32 bit bandwidths.

19. The host bridge of claim 14, wherein both said system bus and said peripheral bus have 32 bit bandwidths.

20. A method of transferring bytes of data in a data string from a peripheral bus to a system bus interconnected by a host bridge, wherein the bytes of data in the data string include a number of valid bytes of data which exceeds that which may be transferred across the system bus in a single system bus clock cycle, said method comprising the steps of:

(a) initiating a data transfer request with a master device on the peripheral bus targeted for a slave device on the system bus, and generating a first byte enable signal indicating which of the bytes of data in the data string are valid and which are invalid;

(b) responding to the data transfer request with the target slave device on the system bus by issuing a bit width signal indicating a bit width of the target slave device;

(c) transferring at least one valid byte of data across the system bus to the target slave device, corresponding to the first byte enable signal, without exceeding the number of bytes of data which may be transferred across the system bus in said single system bus clock cycle;

(d) decoding the issued bit width signal to determine if more than one system bus clock cycle is required to transfer the valid bytes of data in the data string across the system bus to the target slave device;

(e) generating a next byte enable signal if required to complete the transfer of the valid bytes of data in the data string, said next byte enable signal masking the valid bytes of data which have already been transferred across the system bus to the target slave device;

(f) transferring at least one valid byte of data across the system bus to the target slave device corresponding to the next byte enable signal if required to complete the transfer of the valid bytes of data in the data string, without exceeding the number of bytes of data which may be transferred across the system bus in said single system bus clock cycle; and (g) repeating steps (e) and (f) until all of the valid bytes of data in the data string have been transferred across the system bus to the target slave device.

21. The method of claim 20, wherein the target slave device has a bit width of 8 bits and the master device has a bit width of 32 bits.

22. The method of claim 20, wherein the target slave device has a bit width of 16 bits and the master device has a bit width of 32 bits.

23. The method of claim 20, wherein each of said transfers of at least one valid byte of data across the system bus to the target slave device is performed during a single bus clock cycle of the system bus.

24. The method of claim 20, wherein the master device generates said first byte enable signal and the host bridge (i) decodes said bit width signal and (ii) generates the next byte enable signal.

25. A device for use in a computer system having a system bus and a peripheral bus interconnected by a host bridge, for transferring bytes of data in a data string across the host bridge from a master device attached to the peripheral bus to a target slave device attached to the system bus, wherein the bytes of data in the data string include a number of valid bytes of data which exceeds that which may be transferred across the system bus in a single system bus clock cycle, said device comprising:

a first byte enable signal generator for generating a first byte enable signal, in response to a data transfer request initiated by the master device, to indicate which of the bytes of data in the data string are valid and which are invalid;

a bit width signal generator for generating a bit width signal, in response to the data transfer request, to indicate a bit width of the target slave device;

a transfer mechanism for transferring at least one valid byte of data across the system bus to the target slave device, corresponding to the first byte enable signal, without exceeding the number of bytes of data which may be transferred across the system bus in said single system bus clock cycle; and a decoder for decoding the issued bit width signal to determine if more than one system bus clock cycle is required to transfer the valid bytes of data in the data string across the system bus to the target slave device; wherein (i) said generator generates a next byte enable signal if required to complete the transfer of the valid bytes of data in the data string, said next byte enable signal masking the at least one valid byte of data which have already been transferred across the system bus to the target slave device, and (ii) said transfer mechanism transfers at least one valid byte of data across the system bus to the target slave device corresponding to the next byte enable signal if required to complete the transfer of the valid bytes of data in the data string, without exceeding the number of bytes of data which may be transferred across the system bus in said single system bus clock cycle, until all of the valid bytes of data in the data string have been transferred across the system bus to the target slave device.

26. The device of claim 25, wherein the target slave device has a bit width of 8 bits and the master device has a bit width of 32 bits.

27. The device of claim 25, wherein the target slave device has a bit width of 16 bits and the master device has a bit width of 32 bits.

28. The device of claim 25, wherein each of said transfers of at least one valid byte of data across the system bus to the target slave device is performed during a single bus clock cycle of the system bus.

29. The method of claim 25, wherein the master device generates said first byte enable signal, the target slave device generates said bit width signal, and the host bridge (i) decodes said bit width signal and (ii) generates said next byte enable signal.

30. The host bridge of claim 14, further comprising a generator for generating a byte enable signal for each of said two or more system bus compatible data strings based upon the bit width of a component connected to the system bus that functions as a slave during the transfer each of said two or more system bus compatible data strings.

* * * * *